Patented Mar. 17, 1925.

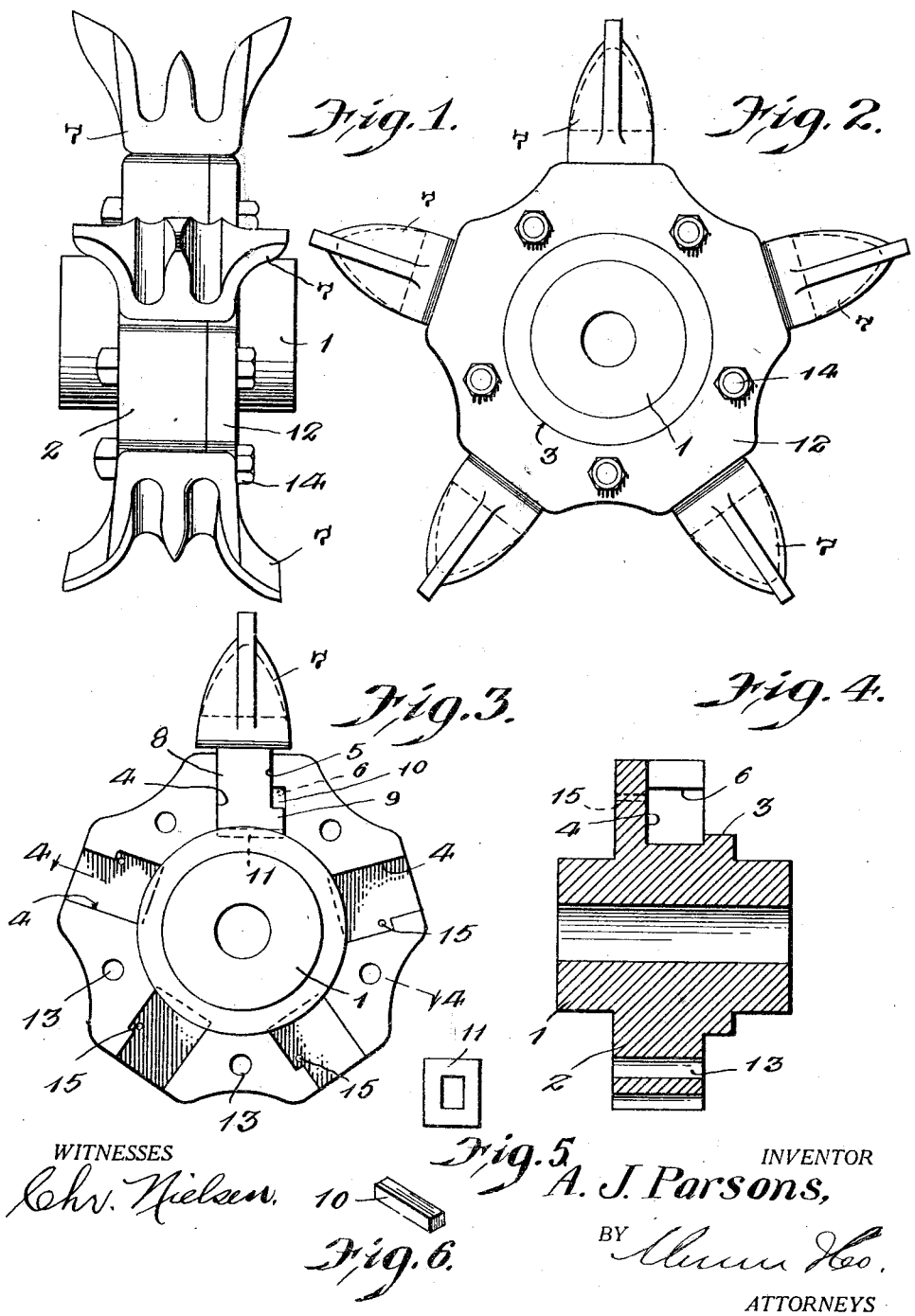

1,530,403

UNITED STATES PATENT OFFICE.

ARTHUR JAMES PARSONS, OF MOBILE, ALABAMA.

SPROCKET WHEEL.

Application filed July 7, 1924. Serial No. 724,617.

*To all whom it may concern:*

Be it known that I, ARTHUR J. PARSONS, a subject of the King of Great Britain, and resident of Mobile, in the county of Mobile and State of Alabama, have invented certain new and useful Improvements in Sprocket Wheels, of which the following is a specification.

My invention is an improvement in sprocket wheels of the type of construction in which the teeth are formed separate from the body of the sprocket wheel and are secured to the body of the sprocket wheel, and it consists in the combinations, constructions and arrangements herein described and claimed.

An object of the invention is to provide a sprocket wheel of the character described which is constructed in such manner that the teeth can be adjusted radially of the sprocket wheel to vary the effective diameter or pitch line of the sprocket wheel and the teeth may be secured to the body in adjusted position firmly, although releasably.

A further object of the invention is to provide a sprocket wheel of the character described which affords facilities for holding the sprocket teeth against movement relatively to the body of the sprocket wheel from adjusted position without there being any necessity of providing openings or grooves in the shanks of the teeth for engaging with holding means carried by the body of the sprocket.

A still further object of the invention is to provide a sprocket wheel of the character described which will be strong, durable and rigid when the parts thereof are secured together in assembled position and in which any of the several component parts can be replaced conveniently and at relatively slight cost without there being any necessity of replacement of the remaining parts of the sprocket wheel.

Other objects and advantages will be apparent from the following description, considered in conjunction with the accompanying drawings, in which,—

Figure 1 is an edge view of a sprocket wheel formed according to the invention,

Figure 2 is a face view of a sprocket wheel.

Figure 3 is a face view of the hub and tooth carrying body of the sprocket wheel, showing one of the teeth in applied position.

Figure 4 is a section along the line 4—4 of Figure 3.

Figure 5 is a face view of a shim which may be comprised in the sprocket wheel, and Figure 6 is a perspective view of a locking key which may be used in the sprocket wheel to hold a tooth against movement in respect to the body of the wheel.

A sprocket wheel embodying the invention is designed primarily, although not necessarily, for use in supporting and driving a cable or chain provided with means for conveying relatively heavy material. In sprocket wheels having removable teeth and in general use for driving conveyor chains, the teeth ordinarily are driven in the recesses or sockets in the barrel or body of the sprocket wheel and are further secured to the body of the spocket wheel by bolts or like fastening devices which extend through openings in the body of the wheel and through openings or grooves in the shanks of the teeth. It has been found in actual practice that the shanks of such teeth are weakened because of the provision of the bolt receiving openings or grooves therein to such an extent that the teeth are likely to break when subjected to the ordinary stresses for which the sprocket wheel is intended. Moreover, it is difficult to remove such teeth in case of breakage and the body of the wheel may be cracked or strained when the teeth are driven into place in the sockets therein. Still another objectionable feature of sprocket wheels of the character described and in general use prior to my invention is that the teeth thereof cannot be adjusted radially of the body of the wheel without the shanks of the teeth being further weakened by the boring of openings or the forming of grooves therein for engagement with the means for securing the teeth in adjusted position.

The hereinbefore recited objecticnable features of sprocket wheels of the character described which have been provided prior to my invention and of which I am aware are obviated when a sprocket wheel suitable for use in the service referred to is formed according to my invention, as will be understood from the following description.

A sprocket wheel embodying the invention comprises a hub 1 enlarged radially intermediate its ends to provide an annular body portion 2. The body 2 is reduced in diameter or cross sectional area adjacent to one of its ends to define an annular shoulder 3. Outwardly of the shoulder 3, the body 2 is provided with a plurality of spaced apart lateral sockets 4, each of which opens at its outer end through the periphery of the body 2 and is reduced in width for an appreciable distance from its outer end as indicated at 5, thus defining a shoulder 6 located at the inner end of the reduced portion 5 and facing radially inward or toward the bottom wall of the socket. The sockets 4 are spaced so that the distance on the periphery of the body 2 between adjacent sockets is the same in each instance and of course any suitable number of the sprockets 4 may be provided.

Teeth as indicated at 7 corresponding in number to the sockets 4 are provided. The outer end portion of each tooth is fashioned to adapt the tooth for engagement with the link of a conveyor chain or cable and may be of any suitably known construction. The inner end portion or shank of each tooth, indicated at 8, is adapted to interfit one of the sockets 4 rather closely but does not completely fill the socket 4 in that the radial dimension of a lug 9 which extends laterally of the shank 8 of the tooth at the extremity of the latter is considerably less than the distance between the shoulder 6 and the bottom wall of the socket. Therefore, it is obvious that each tooth 7 may be moved radially in respect to the body 2 without lateral displacement of the shank of the tooth from the socket 4 in which said shank is disposed. The innermost position of each tooth will be reached when the inner end of the shank of the tooth is in contact with the bottom wall of the socket 4 in which said shank is disposed and the outermost position of the tooth will be reached when the lug 9 is in contact with the shoulder 6. The tooth may be retained against radial movement in the socket from its innermost position by means of a locking key 10 as best seen in Figure 6 which may be driven to the position illustrated in Figure 3, whereby the shank of the tooth will be clamped against the bottom wall of the socket. The tooth 7 may be held in its outermost position by one or more shims such as that indicated at 11 and best seen in Figure 5, the shim or shims being driven between the inner end of the shank 8 and the bottom wall of the socket and preventing inward movement of the shank in the socket.

The tooth 7 may be secured against radial movement relatively to the body 2 in any position between its innermost and outermost positions by means of one of the locking keys 10 and one or more shims 11 arranged as illustrated in Figure 3, the thickness of the shim or shims and the size of the locking keys varying according to the desired adjustment of the tooth radially of the body 2.

The locking keys or shims or both tend to also engage with the walls of the sockets and with the shanks of the teeth in such manner as to hold the shanks of the teeth against lateral displacement from the sockets. However, lateral displacement of the shanks of the teeth from the sockets is positively prevented through the agency of a retaining disk 12 which fits upon the annular shoulder 3 against the adjacent face of the body 2 and against the shanks of the teeth, the locking keys and the locking shims in the sockets. The body 2 is provided intermediate the sockets 4 with openings 13 and the retaining disk 12 is provided with corresponding openings whereby the disk 12 may be clamped against the body 2 by means of bolts and nuts as indicated at 14 or like fastening devices, the bolts of course being extended through aligned openings in the body and retaining disk.

From the foregoing description of the various parts of the device, the operation thereof may be readily understood. The hub 1 is adapted to be mounted on a drive shaft, not shown, and the teeth 7 are adapted to engage with a conveyer chain or cable, not shown, to support and drive the latter. When a sprocket wheel embodying the invention is placed in service initially, the teeth probably will be secured in their innermost position. The teeth then can be moved radially outward to enlarge the effective diameter or pitch line of the wheel as required to compensate for wear on the chain or teeth or on both. The locking keys employed to secure the teeth in their innermost position can be machined to reduce the size thereof to an extent sufficient to adapt the keys for use in conjunction with one or more of the shims 11 to secure the teeth in any radially adjusted position between the innermost and the outermost positions of the teeth. In order to remove one of the teeth for the purpose of replacement or repair, it is only necessary to detach the retaining disk 12 from the body and then to remove the locking key or shim or both for the tooth from the socket in which the tooth is disposed. The tooth then can be moved laterally outward from its socket. An opening 15 is formed through the body 2 for each of the sockets 4, each opening 15 extending through the body 2 to open into the socket 4 with which it is associated slightly below the shoulder 6 and therefore in line with the locking pin 10 in place in the socket. A driving pin, not shown, therefore may be extended through the opening 15 against the inner end of the pin 10 to effect the convenient removal of the latter when it is desired to remove the tooth from the socket. The retaining disk 12 may be formed of segmental sections secured together in any suitable known manner or each adapted to be secured separately to the body 2 or may be formed in one piece as illustrated in the drawings.

Obviously, my invention is susceptible of embodiment in forms other than that illustrated in the accompanying drawings and I therefore consider as my own all such modifications and adaptations of the form of the device herein described as fairly fall within the scope of the appended claims.

I claim:—

1. In a sprocket wheel, a hub having a substantially annular body portion integral therewith, said body having a plurality of lateral sockets formed in one face thereof, each socket opening at its outer end through the periphery of the body and each having a shoulder extending thereinto from a side wall of the socket, a tooth for each socket, said tooth having a shank portion adapted to be disposed in the socket and having limited movement radially of the body in the socket, said shank having a lateral lug disposed between said shoulder and the inner wall of the socket, a locking key inserted between said shoulder and said lug to hold said shank against outward movement in the socket, and a retaining disk adapted to be clamped to said body to hold said shank and said locking key against lateral displacement from said socket.

2. In a sprocket wheel, a hub having a substantially annular body portion integral therewith, said body having a plurality of lateral sockets formed in one face thereof, each socket opening at its outer end through the periphery of the body and each having a shoulder extending thereinto from a side wall of the socket, a tooth for each socket, said tooth having a shank portion adapted to be disposed in the socket and having limited movement radially of the body in the socket, said shank having a lateral lug disposed between said shoulder and the inner wall of the socket, a spacing member inserted between the inner end of said shank and the adjacent wall of said socket to limit the inward movement of said shank in said socket, and a locking key insertable between said lug and said shoulder to hold said shank against said spacing member and to prevent outward movement of the shank in the socket.

3. In a sprocket wheel, a hub having a substantially annular body, said body having a plurality of lateral sockets formed in one face thereof, each socket opening at its outer end through the periphery of the body and each having a shoulder extending thereinto from a side wall of the socket, a tooth for each socket, said tooth having a shank portion adapted to be disposed in the socket and having limited movement radially of the body in the socket, said shank having a lateral lug disposed between said shoulder and the inner wall of the socket, a locking key inserted between said shoulder and said lug to hold said shank against outward movement in the socket.

ARTHUR JAMES PARSONS.